(12) United States Patent
Mathues

(10) Patent No.: US 10,143,227 B2
(45) Date of Patent: Dec. 4, 2018

(54) DISPLACING APPARATUS WITH SERIAL CHAMBERS FOR USE WITH FOOD PRODUCT ROLL PEELER

(71) Applicant: Vanmark Equipment, LLC, Creston, IA (US)

(72) Inventor: Thomas P. Mathues, White Lake, MI (US)

(73) Assignee: Vanmark Equipment, LLC, Creston, IA (US)

( * ) Notice: Subject to any disclaimer, the term of this patent is extended or adjusted under 35 U.S.C. 154(b) by 172 days.

(21) Appl. No.: 15/173,877

(22) Filed: Jun. 6, 2016

(65) Prior Publication Data

US 2016/0353791 A1 Dec. 8, 2016

Related U.S. Application Data

(60) Provisional application No. 62/193,382, filed on Jul. 16, 2015, provisional application No. 62/170,783, filed on Jun. 4, 2015.

(51) Int. Cl.
| | |
|---|---|
| *A23N 7/10* | (2006.01) |
| *A23N 7/02* | (2006.01) |
| *B65G 19/30* | (2006.01) |

(52) U.S. Cl.
CPC ............... *A23N 7/10* (2013.01); *A23N 7/02* (2013.01); *B65G 19/306* (2013.01)

(58) Field of Classification Search
CPC ........... A23N 7/10; A23N 7/02; B65G 19/306
See application file for complete search history.

(56) References Cited

U.S. PATENT DOCUMENTS

| | | | | | |
|---|---|---|---|---|---|
| 2,249,787 | A | * | 7/1941 | Savage | A23N 7/02 99/624 |
| 2,776,690 | A | * | 1/1957 | Warren | A23N 7/00 15/3.17 |
| 3,351,112 | A | * | 11/1967 | Creed | A23N 7/01 426/482 |
| 3,566,742 | A | * | 3/1971 | Bemiss | F41H 5/20 277/641 |

(Continued)

FOREIGN PATENT DOCUMENTS

| | | | |
|---|---|---|---|
| FR | 2345946 | * | 10/1977 |
| FR | 2648680 | * | 12/1990 |

OTHER PUBLICATIONS

Derwent Abstract for FR 2648680 published Dec. 1990.*

(Continued)

Primary Examiner — Anthony J Weier
(74) Attorney, Agent, or Firm — Jason H. Foster; Kremblas & Foster

(57) ABSTRACT

A peeling apparatus and method using rotating rollers as a peeling bed includes a mechanism that moves food products through the peeling bed. The mechanism has multiple walls mounted to a continuous loop that is driven over the peeling bed to define cavities between each adjacent pair of walls. The walls' lower edges are spaced close to the rollers to prevent food products from exiting a cavity. One or more of the walls may have cleaners, such as spray nozzles connected to high pressure liquid, to clean particles from the rollers. The nozzles spray the particles off as the spray nozzles pass over the rollers during normal operation of the peeling apparatus.

14 Claims, 12 Drawing Sheets

(56) References Cited

U.S. PATENT DOCUMENTS

| | | | | |
|---|---|---|---|---|
| 3,602,280 A | * | 8/1971 | Hill | A23N 7/02 99/484 |
| 3,656,527 A | * | 4/1972 | Vadas | A23N 4/20 426/482 |
| 3,855,916 A | * | 12/1974 | Lazzarini | A23N 7/02 99/623 |
| 4,237,782 A | * | 12/1980 | Bichel | A23N 7/02 134/132 |
| 4,394,398 A | * | 7/1983 | Wilson | A23N 7/02 426/481 |
| 4,437,398 A | * | 3/1984 | Savi | A23N 7/00 99/584 |
| 4,481,875 A | * | 11/1984 | Toyosato | A23N 15/08 83/877 |
| 4,519,305 A | * | 5/1985 | Vanosdall | A23N 7/02 99/625 |
| 4,770,887 A | * | 9/1988 | Tarry | A23N 7/00 426/482 |
| 4,889,045 A | * | 12/1989 | Backus | A23N 15/08 99/516 |
| 5,231,921 A | * | 8/1993 | Kirk | A23N 7/01 83/881 |
| 5,780,088 A | * | 7/1998 | Zittel | A23N 12/023 426/481 |
| 5,858,429 A | | 1/1999 | Wallace | |
| 7,121,929 B2 | | 10/2006 | Wallace | |
| 7,197,978 B2 | | 4/2007 | Wallace | |
| 7,428,863 B2 | | 9/2008 | Wallace | |
| 2001/0046541 A1 | * | 11/2001 | Thomas | A23N 7/02 426/482 |
| 2005/0082144 A1 | * | 4/2005 | Maupin | A23N 7/02 198/659 |

OTHER PUBLICATIONS

English Translation for FR2648680 published Dec. 1990.*
Derwent Abstract for FR 2345946 published Oct. 1977.*
English Translation for FR2345946 published Oct. 1977.*

* cited by examiner

DISPLACING APPARATUS WITH SERIAL CHAMBERS FOR USE WITH FOOD PRODUCT ROLL PEELER

CROSS-REFERENCES TO RELATED APPLICATIONS

This application claims the benefit of U.S. Provisional Application No. 62/170,783 filed Jun. 4, 2015 and U.S. Provisional Application No. 62/193,382 filed Jul. 16, 2015. These prior applications are hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

This device relates generally to apparatuses that mechanically peel food products, such as vegetables, and more particularly to food product peelers that use a freely tumbling peel bed.

Vegetables and other food products have traditionally been peeled by hand, using a knife or other tool to remove the skin and any bruises or other blemishes in the surface. Manual peeling is time-consuming and the human peeler can be injured by any mistake. Industrial peeling of vegetables is commonly accomplished by machines that remove an outer layer of the vegetables using rotating cylindrical brushes, rollers, or other structures that rub against the vegetable's surfaces and remove matter. This action desirably removes the skin and most blemishes.

Some industrial peelers are referred to as "U-bed" or "J-bed" continuous peelers. This is because the brushes, rollers, or other cylindrical abrasive structures that rotate against the vegetables' surfaces are arranged substantially parallel and their axes, when viewed from one end, extend around a U-shaped or J-shaped curve. A peeler "bed" is formed by the shape of the collection of closely-spaced rolls that support the vegetables while peeling them. The produce may be placed in one end of the peel bed and removed from the opposite end. Alternatively the produce may be placed in the peel bed in a batch and the entire batch removed from the peeler at one time. In both scenarios, during the time that the produce is traversing the length of the peeler, or simply tumbling around in the peel bed, the produce encounters the abrasive surfaces sufficiently to accomplish the desired result.

The current technology of so-called U-bed or J-bed continuous peelers is divided into two distinct groups, which represent different styles of machines. The first group is characterized by products sold by Vanmark Equipment, which use a peel bed made up of parallel abrasive rollers extending around a semicircle wrapping nearly 180 degrees, which means the rollers extend along the lowest portion of the peel bed and along both opposing sides of the peel bed in the shape of a half circle. When viewed from the end, the U-shaped or J-shaped curve that extends through the axles of the parallel rollers has a "diameter", which is the distance between a first abrasive surface on one side of the curve and a second, opposing abrasive surface on the opposite side of the curve.

The overall motion in this style machine can be seen as a rolling product bed that is revolving roughly around an imaginary center of the peel bed diameter. The driving force for the motion is the abrasive surfaces on the peeler rolls. When this abrasive "traction" is high the group of product pieces moves in an ever-turning loop around the peel chamber's imaginary center, thereby exposing different product surfaces to the active peeling roll surfaces. The peel bed diameter, when viewed end on, is of a sufficient dimension that a product piece falling from the top-most part of the path will fall and be driven by other falling pieces toward the entry point sufficiently far that each will be reintroduced to the peeling action. This cyclical motion provides a random circulation of pieces toward and away from the abrasive surfaces.

In the case of continuous peelers, the motion of product longitudinally from the entry end to the exit end of the peel bed is driven by something akin to hydraulic leveling, because the combination of moving food product pieces, water and peel has fluid properties. The motion of the bed could be said to be "fluidized" and is somewhat unpredictable, because while one food product piece may reside in the bed for one amount of time, another piece may be resident in the bed for a different amount of time. Depending on the presentation of any given piece of product to the abrasive rolls the peeling effect may also exhibit similar variability. A constant infeed stream produces an equally constant exit stream similar to the water in a reservoir exiting over a dam as a result of forces caused by water introduced at the infeed end of the reservoir. Thus, as new product is introduced at the entry end the surface level of the moving product bed is forced to rise. With that rise, the product closest to the exit end spills over a threshold and exits the machine, thereby maintaining a product level equilibrium.

The second style machine is typically, but not necessarily, characterized by a larger diameter product bed with rolls often covering a smaller portion of the arc of the diameter than in the first style. The sides of the product bed are not intentionally specified dimensionally to maintain the product tumbling motion described in the first style. Without the rolling bed motion there is no guarantee that product will turn randomly or that it will move with a desirable level of uniformity through the machine. To improve the movement of the pieces an auger is commonly introduced through the center of the machine, and the auger urges the product through the machine. The auger has the advantage of more precisely controlling the period of time the product stays in the machine even though the auger does not guarantee a particular dwell time within the peeler for each product piece. Thus, even with the auger, the pieces are only encouraged to move along the roll bed.

Because of the physical proximity of the auger's angled surfaces to the roll bed, the auger controls longitudinal movement by interfering with the random motion desired to present all surfaces to the peeling action of the machine. An auger presents a continuous surface area that bears against the food products, such as potatoes, and that contact prevents the food products from moving freely. Furthermore, an auger presents a central axle that represents a continuous barrier to free motion if the product bed depth seeks to be higher than the central axle. Both features of an auger inhibit the natural rolling of the fluid bed referred to above, and this limits the inherently thorough removal of skin and blemishes from all products. One desirable feature of an auger is the control of residency or dwell time of food products within the peeler. If the depth of the peel bed is higher than the axle or center of rotation of the auger, the desired control over the food product time within the peeler is lost as individual product pieces "spill over" the auger walls into another cavity.

To overcome the disadvantage of this second type of peeler, peelers may be built with the larger bed diameter described above in association with the first type of machine. One advantage of this hybrid-style peeler over the first type is that it can be scaled quite large. One disadvantage is that when the bed is not tumbling freely, the ability to peel all surfaces evenly may be sacrificed.

Prior art peelers operate either in batch processes—in which the peeler is filled, the peeler operates, and then is emptied entirely—or continuous processes—in which product flows in one end and out the opposite end, and in which an average dwell time is assumed for each product. Dwell time, which is the amount of time that a piece of food product dwells in a peeler, is an important factor, because it has an effect on how much of the food product's outer surface is abraded. In batch processing, the dwell time is known, but batch processing is known to lead to large variations in the amount of product in the processing stream. The dwell time is averaged for each food piece in prior art continuous process peelers, and this may lead to some products being over-peeled and others being under-peeled. Other factors, such as roll speed, bed depth (depth of the food products in the bed), and others, affect the level of peeling from a minimum of essentially cleaning to a maximum of removing more than all of the skin. Once these peel-impacting factors have been established to optimize the amount of peeling in a continuous operation, changing any of them will reduce optimization. That is because varying one factor alters the optimized operation.

Examples of prior art peelers may be found in U.S. Pat. Nos. 7,428,863; 7,197,978; 7,121,929 and 5,858,429, all to Wallace. The preceding patents are hereby incorporated by reference. With a batch or continuous process peeler, the only way to adjust for greater supply or demand from upstream or downstream equipment is to perform more or fewer batches or to speed up or slow down the continuous operation peeler. However, the batch machine requires manpower to operate and can only handle a predefined number of batches per unit time. Furthermore, continuous operation machines are not optimized when the speed, quantity of food products and other factors are altered. Therefore, the need exists for a peeler that overcomes the above-noted disadvantages.

BRIEF SUMMARY OF THE INVENTION

A conveyor is disclosed herein with a series of movable dividers that are driven by a central wire, chain, or other preferably flexible structure. These dividers are evenly spaced and have wall edges in the shape of the edges of the surrounding rollers. Food product pieces may be introduced into one end of the apparatus and moved along the confining, and preferably rotating, abrasive rollers by the tight-fitting dividers. The food product pieces are displaced to a discharge point where they exit the apparatus.

The structure of the invention results in advantages known to both batch and continuous peelers, because between each divider is an exactly defined volume chamber or cavity that can hold a batch of food product pieces. Furthermore, each chamber is optimized in bed depth, speed, and other peeling-impacting factors. Thus, each individual cavity is optimized by itself. If it becomes desirable, one can skip one or more chambers by omitting any food products from those chambers. This may be, for example, to address a decreased demand for product downstream. Skipping a chamber has no effect on the food products in other chambers, because each chamber is a unique and independent batch of food products being conveyed through the apparatus. Even the movement of the food products in the chamber is unaffected by the food products, or lack thereof, in adjacent chambers. The existence of separate chambers thus allows one to change the production of the apparatus without affecting any variable that affects peeling optimization. Once the peeler is optimized, one can fill as many or as few cavities as needed to meet downstream demand or upstream supply. Thus, the invention has separate cavities, and each cavity holds a separate batch while maintaining the advantage of a continuous system that keeps each batch moving through the peeler bed.

Figure 1:
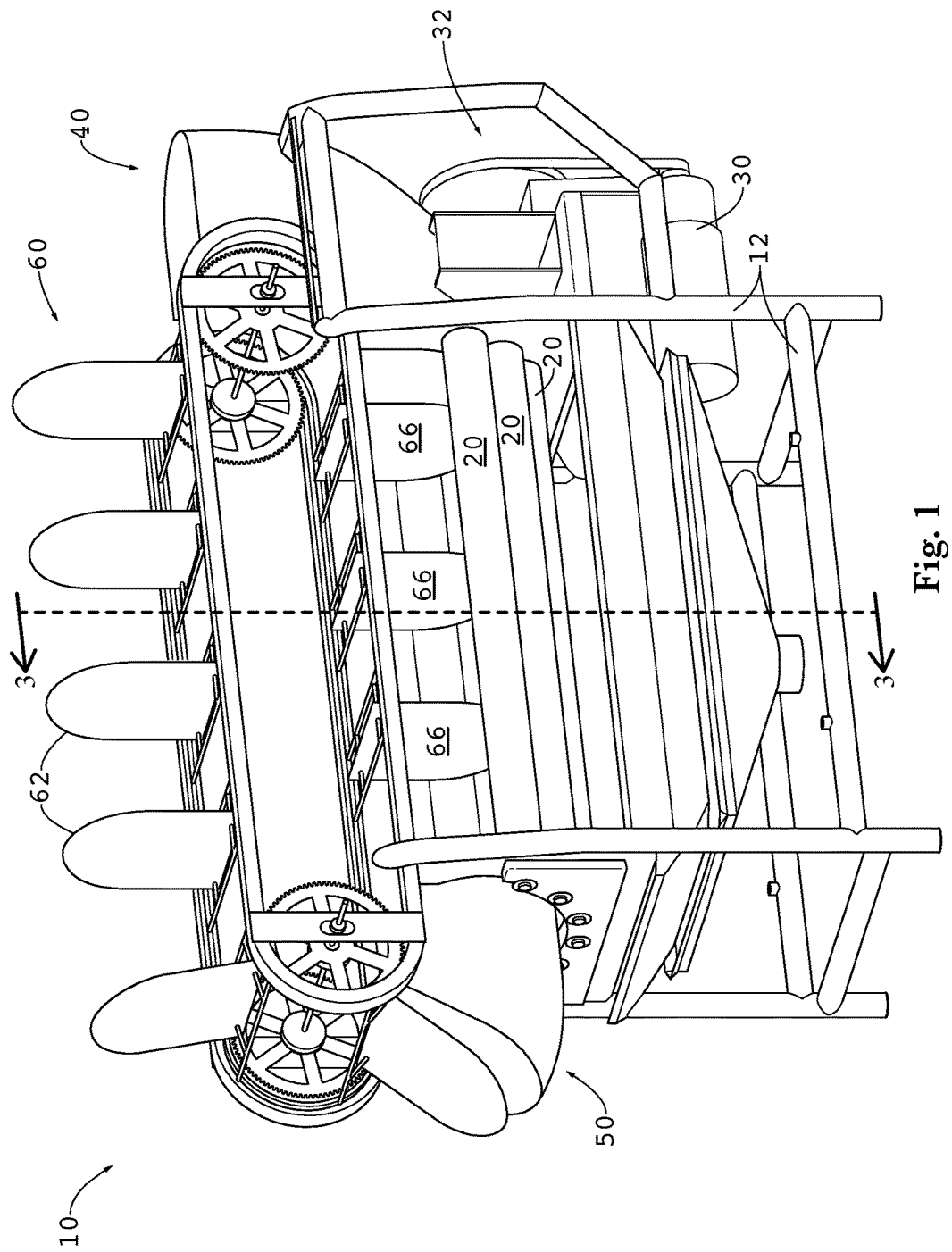
FIG. 1 is a view in perspective illustrating a first embodiment of the present invention with the machine's outer skins and guarding removed for visualization.
Figure 3:
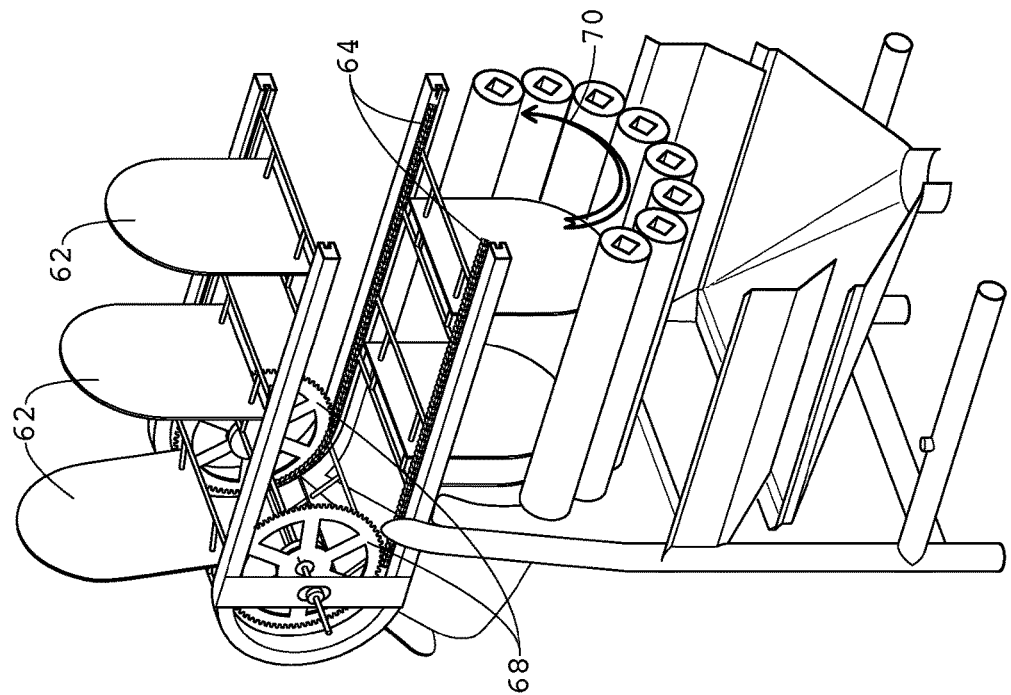
FIG. 3 is a side view in section illustrating the embodiment of FIG. 1 through the line 3-3.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 62/170,783 filed Jun. 4, 2015 and U.S. Provisional Application No. 62/193,382 filed Jul. 16, 2015 are hereby incorporated in this application by reference.

Figure 2:
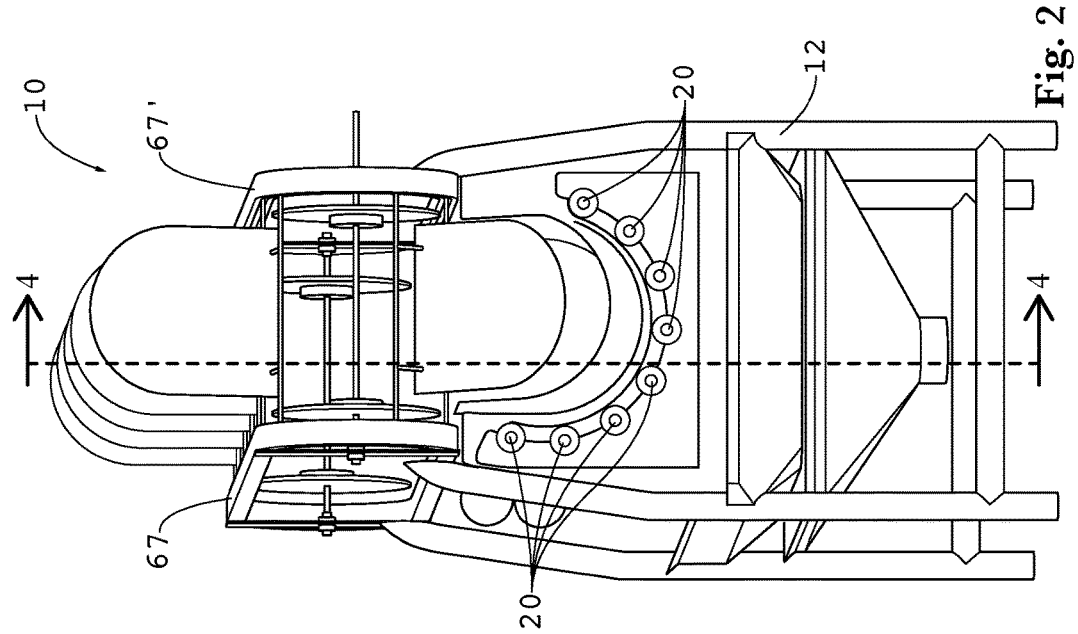
FIG. 2 is an end view illustrating the embodiment of FIG. 1.

The peeling apparatus 10 is shown in FIGS. 1-4 having a plurality of abrasive rollers 20 extending lengthwise along the flow path of the apparatus 10, and the axes of these rollers 20 form a U-shape (or J-shape), as shown in the end view of FIG. 2. The rollers 20 are conventional structures known in the field of peelers, and may be brushes or solid rods with abrasive outer surfaces described in the patents incorporated herein. The rollers are used to abrade or otherwise remove the soil and/or skin from a food product, such as a potato, beet, carrot, or any other vegetable or other food product. The rollers 20 rotate in the same direction, as driven by a motor 30 that drives a conventional drive mechanism 32, which may be a belt driven by pulleys, a chain driven by sprockets, gearing, or any other suitable linkage including multiple motors with each motor driving one or more of the rollers 20.

Food product pieces (not shown) are placed, such as by pouring or overflowing from a conveyor belt mechanism (not shown), into an inlet chute 40 at one longitudinal end of the apparatus 10. The food product pieces may be any food product used with the machines disclosed in the patents incorporated herein, including, but not limited to potatoes, carrots, and beets. The rollers 20 rotate and create a "rolling product bed" as the rollers abrade and peel the food pieces, causing an ever turning loop around the peel chamber's imaginary center as described below. The product pieces move longitudinally along the apparatus 10 from the chute 40 to an exit end 50 and are peeled progressively along the way as described below. The position of the peeling apparatus 10 in a system of food product processing is shown schematically in FIGS. 12 and 13, in which the peeling apparatus 10 is positioned downstream of various pieces of equipment that convey food product pieces to the apparatus 10, such as a food product washer, a food product halver or any other piece of equipment known in the industry. Downstream of the peeling apparatus 10 may be any other piece or pieces of equipment that may further process the peeled food pieces, including without limitation one or more hydrocutting systems that cut potatoes or other vegetables or food products. There is no limitation to the kinds of machines that may be positioned upstream and downstream of the peeling apparatus 10, and with which the peeling apparatus cooperates as a system and method.

The product pieces in the apparatus 10 are conveyed longitudinally along the apparatus 10 by a movable wall conveyor 60. The conveyor 60 is mounted to the frame 12, which may be made of stainless steel bars or tubes, and that forms the rigid structure of the apparatus 10 to which other structures are attached. The conveyor 60 is constructed with substantially sheet-like walls 62 that are moved along above the bed of the apparatus 10 to displace one or more food products along the length of the rollers 20 and into and out of the apparatus 10. The lateral and lower edges of the walls 62 are in very close proximity to the outer surfaces of the rollers 20, such as 1-3 millimeters, and up to just less than the smallest dimension of the smallest food product that will be placed in the apparatus 10. With this spacing, the walls 62 allow few to no food products to pass between the walls 62 and the rollers 20. The walls 62 are preferably solid, food-grade plastic, metal or composite, and may be made of material having openings through which water can pass, but through which no food product may pass. Examples include chain, netting and screen fixed around a stiff, U-shaped rod to form a wall frame.

The desired walls 62 differ from conventional augers in that the walls 62 move only in a longitudinal direction along the peeler 10. There is no substantial motion of the walls 62 laterally or rotationally. Furthermore, there is not a slanted moving screw wall that could interfere with the product motion, which could affect peeling. Still further, the size of the peel chamber needed to optimize the desired tumbling of the product can be maintained without sacrificing the height of a central rotation point found in augers, even if they do not have a central axle. The structure of any auger, even an auger having a void where the central axle would be, limits the maximum depth for the product. This is because a central axle prohibits product from extending above the central axle, and in an auger with no central axle there is a risk of tumbling over into an adjacent chamber if the product raises above the auger walls.

Figure 11:
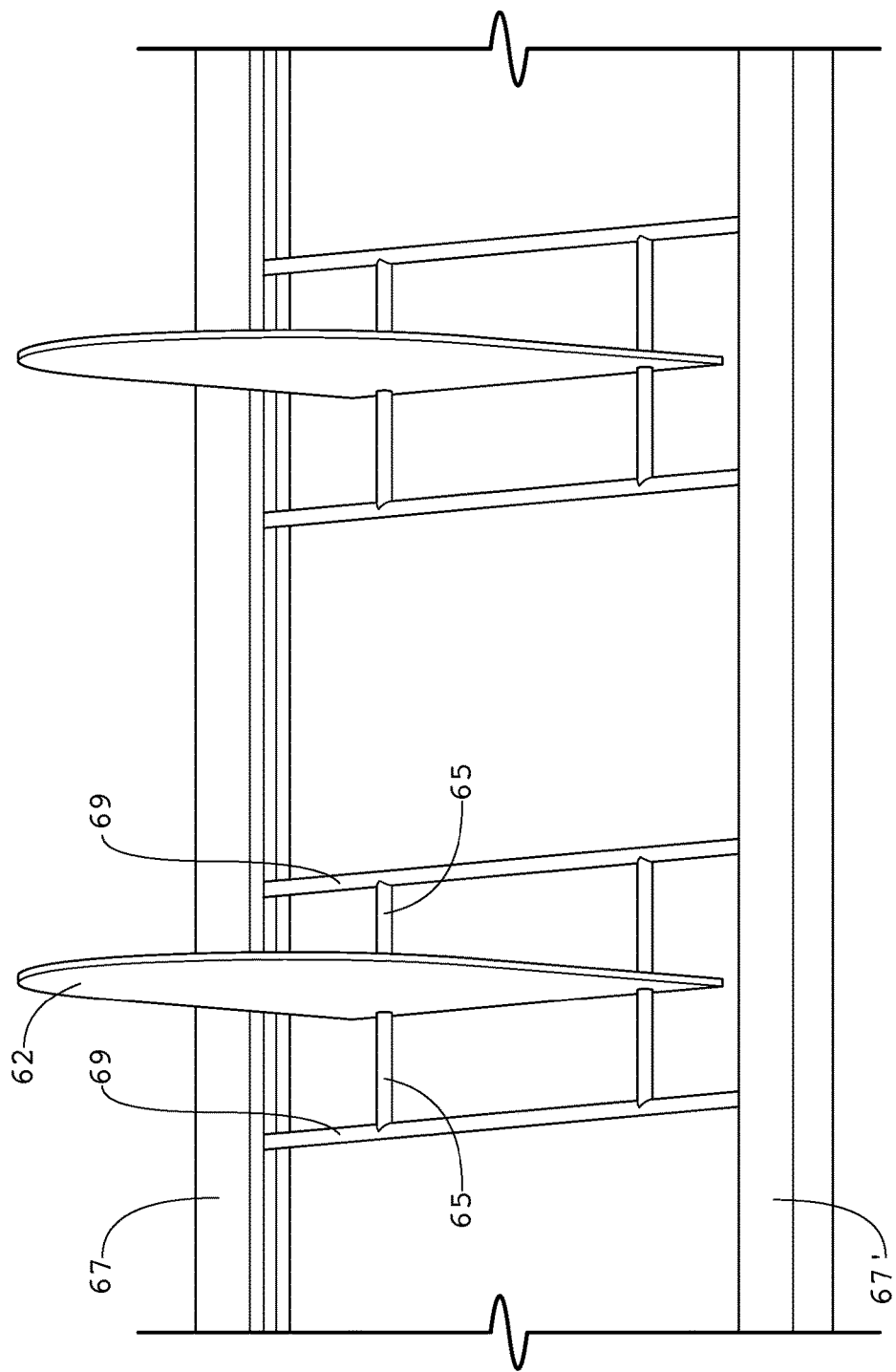
FIG. 11 is a magnified view in perspective illustrating the embodiment of FIG. 1.

Each wall 62 is attached to parallel drive chains 64 or another link drivingly connected to a prime mover, such as a rotary motor near one wall end, such as the top for those walls 62 that are active in the apparatus 10. The drive chains 64 extend through or near the curved tracks 67 and 67' that are mounted rigidly to the frame 12 of the apparatus 10, and each of the curved tracks 67 and 67' guides the drive chains 64 and/or the walls 62 in a loop through the peeling bed of the apparatus 10, and then over the top thereof. As shown in FIG. 11, the top edge of each of the walls 62 has a pair of parallel members 65 extending therethrough (or otherwise fastened thereto) and the members 65 are fixed at their opposite ends to a pair of parallel beams 69 to which the driven link, preferably the drive chains 64, attach. The ends of the parallel beams 69 extend into inwardly facing slots in the curved tracks 67 and 67', which limit the movement of the parallel beams 69 to a loop. The spacing of the parallel beams 69 and their guidance in the tracks 67 and 67' acts through the parallel members 65 and the wall 62 to provide the driving force and the reaction force to the food product being urged along the peel chamber in the chambers 66. In a preferred embodiment, the drive chains 64 are similar to bicycle chains made of a food grade material and extend around the sprockets 68 driven by a speed-controllable electric motor (not visible, which could be a servomotor) that is connected to a central computer (not visible) to which the motor 30 and any sensors are also connected.

As the drive chains 64 are driven along, they displace each of the connected walls 62 along the path through the apparatus 10 that is determined by the tracks 67 and 67'. Each of the tracks 67 and 67' thereby provides a support to guide the driven moving walls 62. Various driven links can substitute for the preferred drive chains 64 described above, and contemplated driven links include guides located above and at least slightly outside the peel bed region of the apparatus 10.

As described above, each of the walls 62 is attached at a top end to a drive structure that mounts to the drive chains 64 near opposing ends. This drive structure preferably has lateral rods (preferably the beams 69) that extend into, and are thereby guided by, inwardly-facing slots in the curved tracks 67 and 67'. The links that drive the walls 62 are connected together to form continuous drive chains 64 that carry a plurality of the movable walls 62 around an elongated loop above the peeling apparatus 10 peel bed. The lower portion or span of the loop is positioned so that the lower and lateral edges of each of the walls 62 are brought into close proximity to the rollers 20, and the upper portion or span of the loop is a return. Two rounded ends complete the loop. The links apply a force through the walls 62 in the peel bed to move the walls 62, and the product in cavities between adjacent walls 62, along and through the peel bed.

In the embodiment shown in FIGS. 1-4, the walls are spaced from one another at predetermined distances, which may be a few centimeters to more than one meter, but may be 10-50 centimeters. This forms cavities 66 between each wall 62 and each next adjacent wall 62. The prime mover, such as a servomotor, rotates the sprockets 68, which have teeth that extend into the drive chains 64 in a conventional manner. The prime mover thereby forces the walls 62 along a path parallel to the inner surfaces of the rollers 20, preferably at a predetermined speed, which may be varied as controlled by the prime mover, and with the walls 62 spaced equally from one another and substantially parallel to every other wall 62 that is actively pushing product through the peeler bed. Thus each cavity 66 is substantially the same volume and any product in any cavity 66 is moved at the same speed through the apparatus 10.

Because the lower and lateral edges of the walls 62 approximate the shape of the peel bed, there is preferably insufficient room through any gaps formed between the outer edges of the walls 62 and the closest surface of each of the rollers 20 for product to bypass any of the walls 62 and move into an adjacent cavity 66. It is also preferred that there is insufficient room between the outer edges of the walls 62 and the farthest surfaces of each of the rollers 20 for product to bypass the walls 62. As the walls 62 are moved along the length of the peel bed in close proximity to the rollers 20, the food product pieces that are in the cavities 66 remain in the same cavities 66 throughout their entire time in the apparatus 10 and are moved along at a predetermined speed.

While the food product is pushed through the apparatus 10 in this manner, there is tumbling of the food product pieces within each cavity 66 formed between each pair of adjacent movable walls. This tumbling is driven along by the rollers 20 in the direction of the arrow 70 shown in FIG. 3, and may be a conventional tumbling. The spacing of the walls 62 can be "tuned" to affect this tumbling and other features of the operation. By "tuning" it is meant that the walls can be further separated or moved closer together while the apparatus 10 is not operating so the distances between them are strategically made larger or smaller than that shown in order to have a desired effect. The overall peel bed length can also be modified to be longer or shorter than that shown, and either or both modifications may be made to provide significant freedom for tumbling in each of the cavities 66 formed between any two adjacent movable walls 62. The person of ordinary skill will understand that many factors, including without limitation, the diameter, mass and shape of the food pieces, the toughness of the food surface to be peeled or washed, along with friction and other factors, will be taken into consideration in "tuning" the spacing of the walls 62. As noted above, the speed that the walls 62 are driven may be modified, and the speed, diameter and materials of the rollers may also be modified to have the desired effect. Other factors may be modified, as will be understood by a person of ordinary skill from this disclosure.

Figure 4:
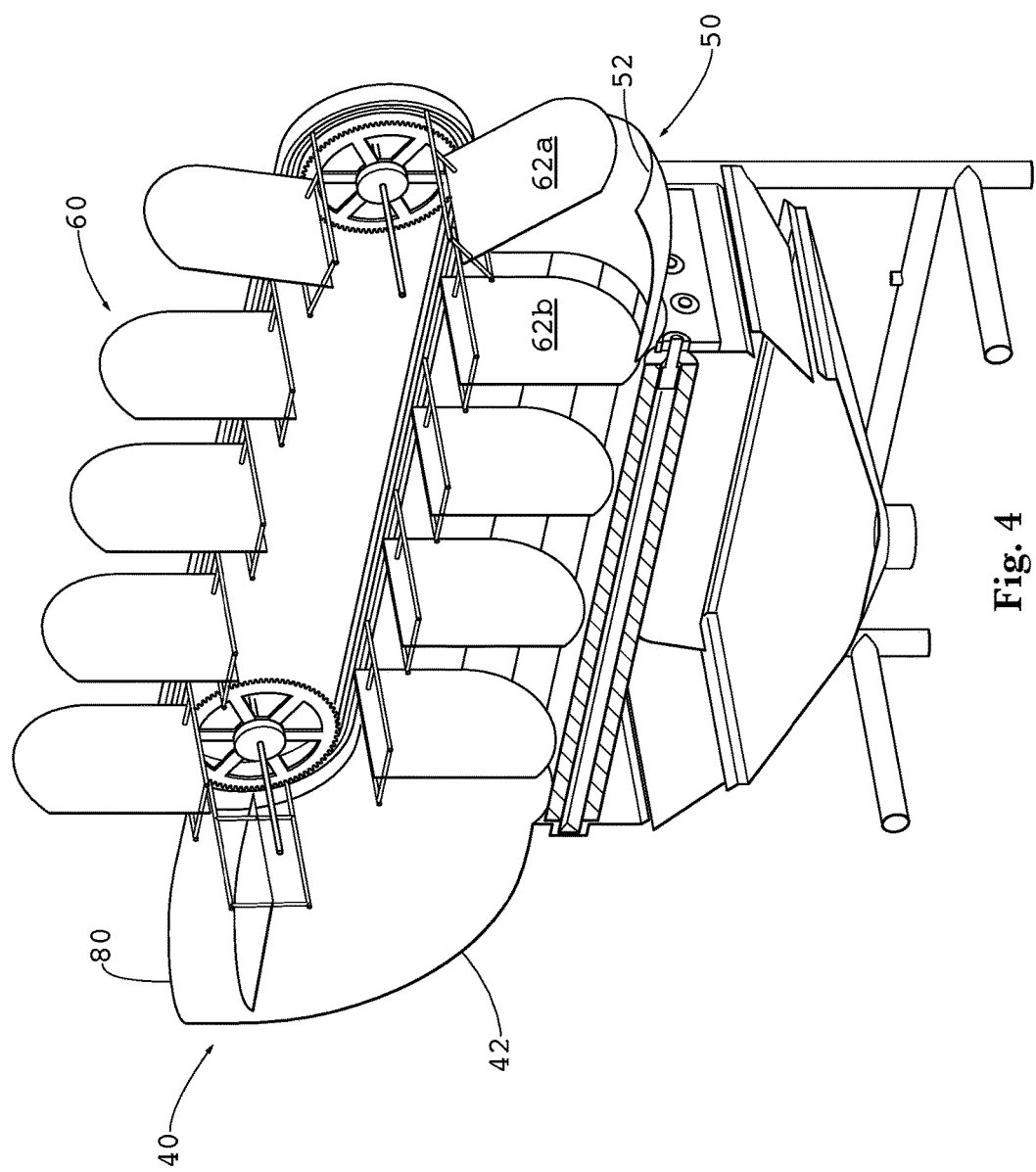
FIG. 4 is a side view in section illustrating the embodiment of FIG. 2 through the line 4-4.

At the chute 40, which is the inlet to the peel bed, the path that the lowest ends of the walls 62 traverse as they are moved along by the link is an arc that the inward face 42 (see FIG. 4) of the chute 40 approximates. The shape at the inward face 42 for the conveyor 60 is illustrated in FIG. 4, and this shape can be modified if components of the conveyor 60 are modified to change the arc along which the walls' lowest edges travel. Incoming product is introduced to the apparatus 10 at the entry chute 40, and the curvature of the inward face 42 is formed along the line of travel of the lowest edges of the walls 62. The product is captured between the movable walls 62 and is carried into the active peeling area (peel bed) of the apparatus 10. The active peeling area is the region just above and laterally adjacent the rollers 20.

The exit end 50 is at the opposite ends of the rollers 20 from the chute 40. There is preferably a small upwardly-curved face 52 in a chute or similar structure to follow the periphery of the movable walls 62 at the exit, but such a structure is less critical than at the entry chute 40. This face 52 prevents the rapid exit of all product in a cavity between the pair of movable walls near the exit end 50. For example, the walls 62a and 62b have a payload of product between them, and as soon as the downstream-most wall 62a (see FIG. 4) has cleared the curvature 52 to form an opening large enough for product to exit, the product will begin to exit. By making a curved face 52, this reduces the rapid exit of all product onto the awaiting conveyor or other structure that is downstream of the apparatus 10 from a given cavity 66 after the leading wall 62a of a given cavity clears the end of the peel chamber in the absence of the curved face. This concept is not crucial to the operation of the peeling apparatus 10, but it can serve as a tuning option in the final configuration of the apparatus 10 for any given product.

Once configured, the walls 62 are preferably maintained a constant distance from one another for the duration of that configuration's operating time through the apparatus 10. The chain 64 driving the series of movable walls 62 is preferably configured so that the timing of the movement of each of the walls 62 parallel to the rollers 20 is consistent during operation. It is not critical that the movable walls 62 always be perpendicular to the axes of the rollers 20, but it is preferably that the walls are while the walls 62 are directly adjacent the rollers 20. The invention allows for walls of varying shapes as may prove advantageous to specific products being processed.

It should be understood that the shape of the inlet chute 40 prevents, or at least reduces the probability of, food products being cut or otherwise damaged by the walls 62 forming a gap between the chute 40 and the walls 62. In particular, each wall 62 may approach the chute 40 as shown in FIG. 4—with the edges of the wall parallel to the top edges 80 and following a radius of curvature that is the same as that of the chute 40. This avoids the formation of an angled gap that could narrow as the wall 62 progresses. This prevents any gap between the walls 62 and the chute 40 from reducing at any point along the chute 40 as the walls 62 are driven along, which otherwise could cause a piece gently resting in the gap to be damaged as the gap is reduced to narrower than the thickness of the piece.

Furthermore, after a first cavity 66 between two walls 62 is filled with product, a second, downstream cavity 66 is available to be loaded with product only after the gaps between the upstream wall 62 of the second cavity 66 (downstream wall of first cavity) and the chute 40 are smaller than the food product pieces. This prevents any pinching of food product that is being loaded into the second cavity. With such an apparatus, it is possible to load one type of food product into the cavity 66 between a first pair of adjacent walls 62, and a different type of food product, or no food product, into the second cavity 66 between the next adjacent pair of walls 62. In this manner, it is possible to leave a cavity 66 empty, and/or vary the type of food product from cavity to cavity within the same apparatus 10.

An advantage of the apparatus 10 is that it provides the ability to skip a cavity as a convenient way to accommodate changes in the capacity of any piece of equipment, upstream or downstream of the apparatus 10, which is part of the food processing process. Thus, when a piece of equipment like the apparatus 10 is working in cooperation with upstream and/or downstream machines (see FIG. 12) that send food products to the apparatus 10 and/or receive food products from the apparatus 10, it may become necessary to change the throughput of the apparatus 10. But, as noted above, changing factors that affect optimization may disrupt optimal operation. Thus, if a piece of upstream or downstream equipment, such as one of a group of multiple slicers downstream of the apparatus 10 that receives the food products coming out of the apparatus 10 or a washer upstream of the apparatus 10, is disabled the apparatus 10 can continue to operate at a reduced rate but with the machine parameters still optimized for each chamber 66. This continued optimization with changes in throughput can be accomplished without overloading a downstream machine or without running out of food product from an upstream machine simply by skipping one or more cavities 66. By filling only some of the cavities 66 with food products, each of the cavities with food products remains essentially unchanged from when the apparatus 10 was operating at full capacity. Furthermore, the absence of food products in an empty cavity 66 does not affect the performance of the food products in a full cavity 66.

Figure 12:
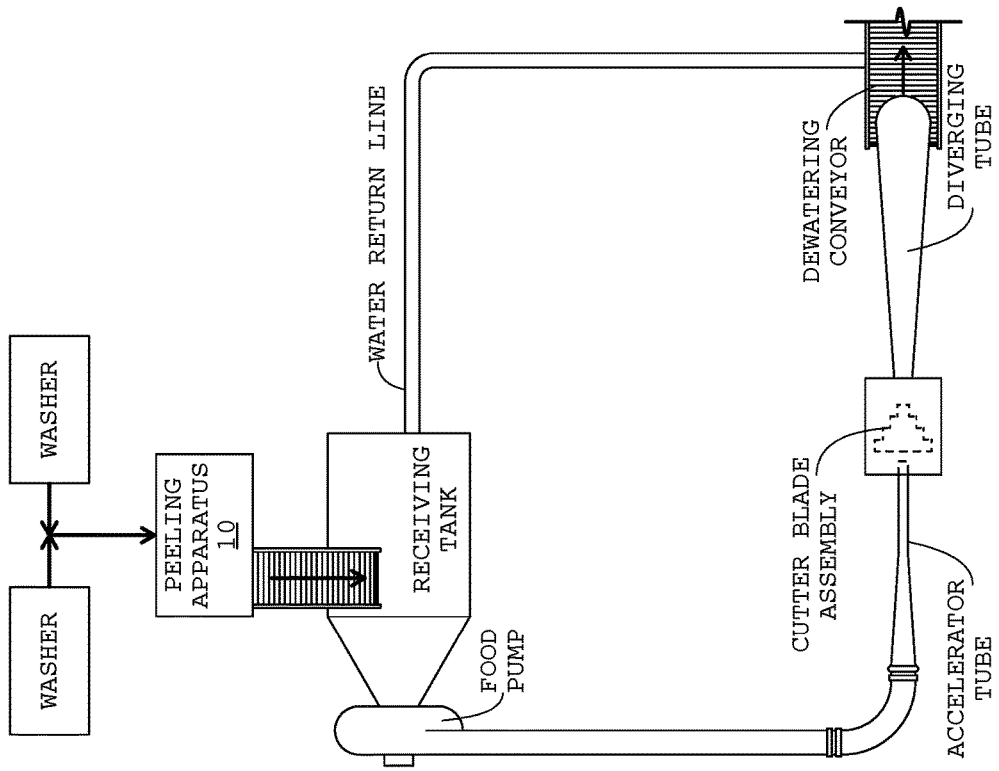
FIG. 12 is a schematic illustration illustrating a possible location of an embodiment of the invention relative to other pieces of equipment in a food processing system.
Figure 13:
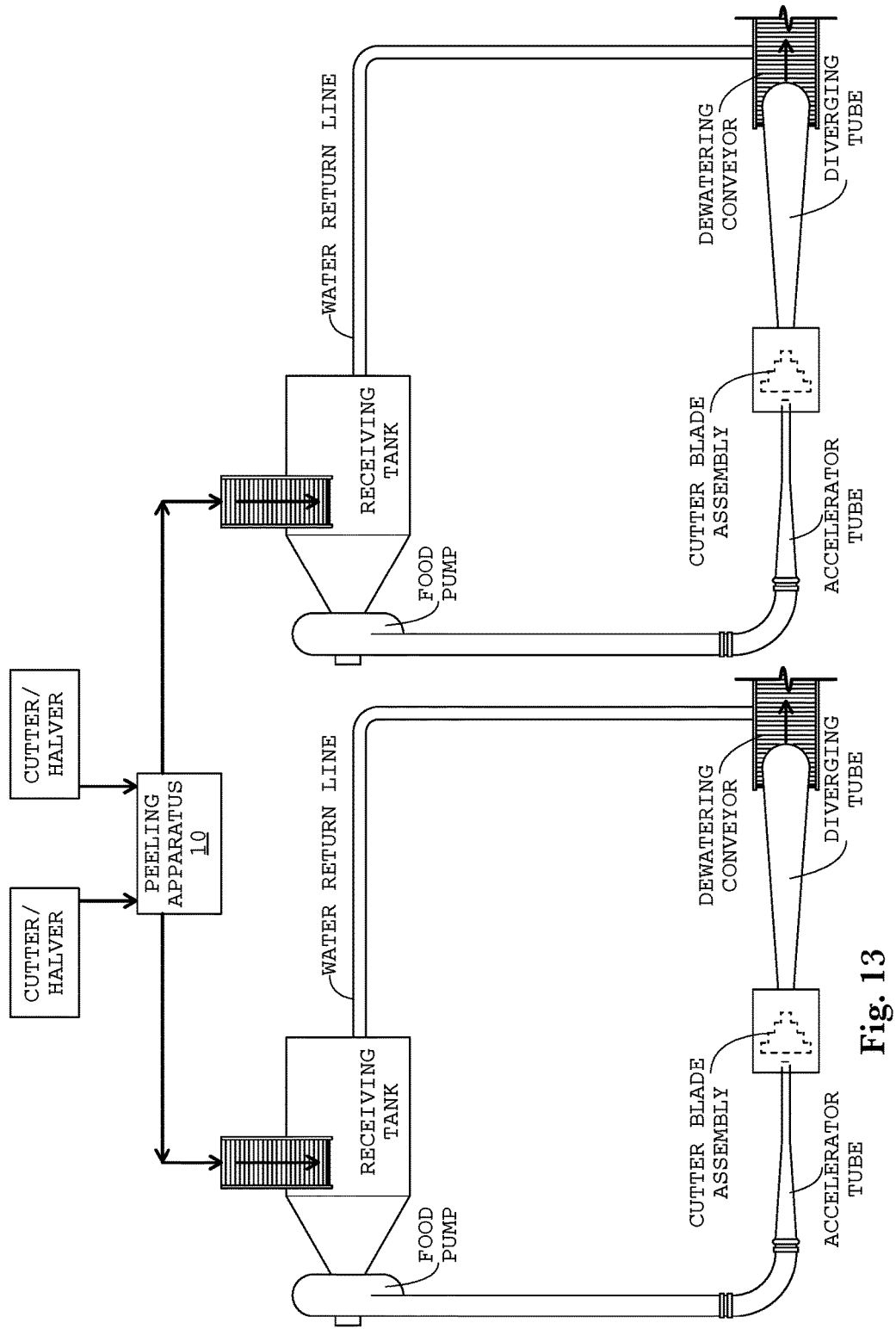
FIG. 13 is a schematic illustration illustrating another possible location of an embodiment of the invention relative to other pieces of equipment in a food processing system.

Thus, if the apparatus 10 is being supplied potatoes by two upstream washing machines, as shown as an example in FIG. 12, and one of the washing machines becomes disabled, the apparatus 10 will receive only half of the quantity of potatoes. With the prior art, this would affect performance because the peeler would have to slow down. But, with the addition of a start and stop feed conveyor that can time the product being fed to each cavity 66, a known technique, a reduction in input by half is easily accommodated in the present invention without modifying any of the factors that affects optimization by simply filling every other cavity 66 and leaving every other cavity empty. Similarly, if the apparatus 10 supplies potatoes to two slicing machines downstream, as shown in FIG. 13, and one of the slicing machines becomes disabled, every other cavity can be left empty so as to not overwhelm the remaining slicer. The previously-described operations are not possible with conventional peeling machines. It is contemplated that a gateway to the chute 40 may be controlled by a computer or manually by a human operator to determine when food products should be loaded or not. The central computer may be connected to the servo motor and the motor 30, and may also receive signals from sensors throughout the system.

There is at least a second advantage to this type of "continuous batch" apparatus 10, in which the dwell time of peeling is carefully controlled for each batch (within a given cavity 66, as with any batch machine), but in which the process is continuous, inasmuch as food products may be poured into the apparatus 10 continuously. This second advantage is that each batch of product introduced into any specific cavity 66 formed by the moving walls 62 may be carefully controlled prior to loading it into the cavity 66, and the results of the operation during the time in the apparatus 10 can be carefully measured, such as by weighing after exit. Because the precise food pieces of each cavity 66 may be tracked as the contents of each cavity 66 exits the machine, each cavity's contents may be reweighed, inspected, or otherwise measured to ensure optimization. This provides information to the food processor regarding the yield efficiency of the peeling operation. This data, coupled with any other information that may be gathered, provides the information needed to further optimize the configuration of the apparatus 10.

It is well known in food peeling technology that brushes, or the abrasive, or otherwise peeling rollers of conventional peelers can become clogged with particles that are removed from the food products passing through the peeler. Such particles reduce the peeling effect of conventional peelers, and clogged machines typically have to be taken out of service to be cleaned of the particles. A second embodiment of the invention, which addresses the issue of clogging in peelers, is shown in the apparatus 110 of FIGS. 5-10. Using the embodiment shown in FIGS. 5-10, the apparatus 110 can be cleaned during normal operation, as described in detail below.

The apparatus 110 is substantively identical to the apparatus 10 described above, and therefore further details of the apparatus 110 will not be disclosed except where there are differences relative to the apparatus 10. A spraying apparatus 170 is added to the apparatus 110, and includes a plurality of nozzles 172 disposed on the periphery of the substantially sheet-like wall 162a. Each roll 120 in the peel chamber is intended to have a corresponding nozzle 172 aimed substantially at its central axis. The wall 162a is similar to the walls 62 in structure and function, and the nozzles 172 are mounted flush to the peripheral edges of the wall 162a, or incorporated into the wall, such as by being formed integrally to the wall 162a. This puts the nozzles 172 in close proximity to each corresponding roll 120 while the wall 162a is in the peel chamber. The nozzles 172 are conventional, high-pressure nozzles that spray water or other liquids from a conduit or other conducting structure. Preferably, the nozzles 172 are positioned such that they spray water directly at each roller 120 during the portion of the traversal of the wall 162a within the peel bed around the path the walls 162 travel. The spray is sufficient to remove most or all of the particles clogging the rollers 120 so that it is not necessary to take the apparatus 110 out of operation for cleaning specific to removing particles from the abrasive surfaces. It is contemplated that the nozzles 172 spray water or another liquid in a pressurized jet directly at the center of each roll 120. The moving wall 162a, traversing the length of the peel bed coupled with the simultaneous rotation of the rolls 120 combine to clean all surfaces of each roll with high-pressure water spray from the nozzles 172 each time the moving wall 162a traverses the peel chamber.

Tubes or other water-conveying passages, which are not visible in the illustrations, extend from the nozzles 172 to an attaching end to receive at least one liquid-conveying conduit 174. The conduit 174 attaches to a source of water or other liquid, such as a conventional industrial water system, and supplies water to the nozzles 172. The tubes that connect the conduit 174 to the nozzles 172 may be on the outside of the wall 162a, or they may be integral with the wall 162a. The source of water feeding the conduit 174 thus extends through the tubes of the wall 162a to convey water to the nozzles 172.

It is contemplated that the source of water can be an existing source of water for the apparatus 10 described above, but if there is no existing source of high-pressure water that the conduit 174 can be connected to, a conventional high-pressure water system may be added to the apparatus 110. The conduit 174 can comprise a plurality of rigid tubes that connect to one another at sealed, rotating joints to permit substantially free movement of the wall 162a as it traverses the entire path. Any suitable alternative liquid conduit could be used instead of the plurality of rigid tubes shown, including, without limitation, a flexible hose.

Figure 5:
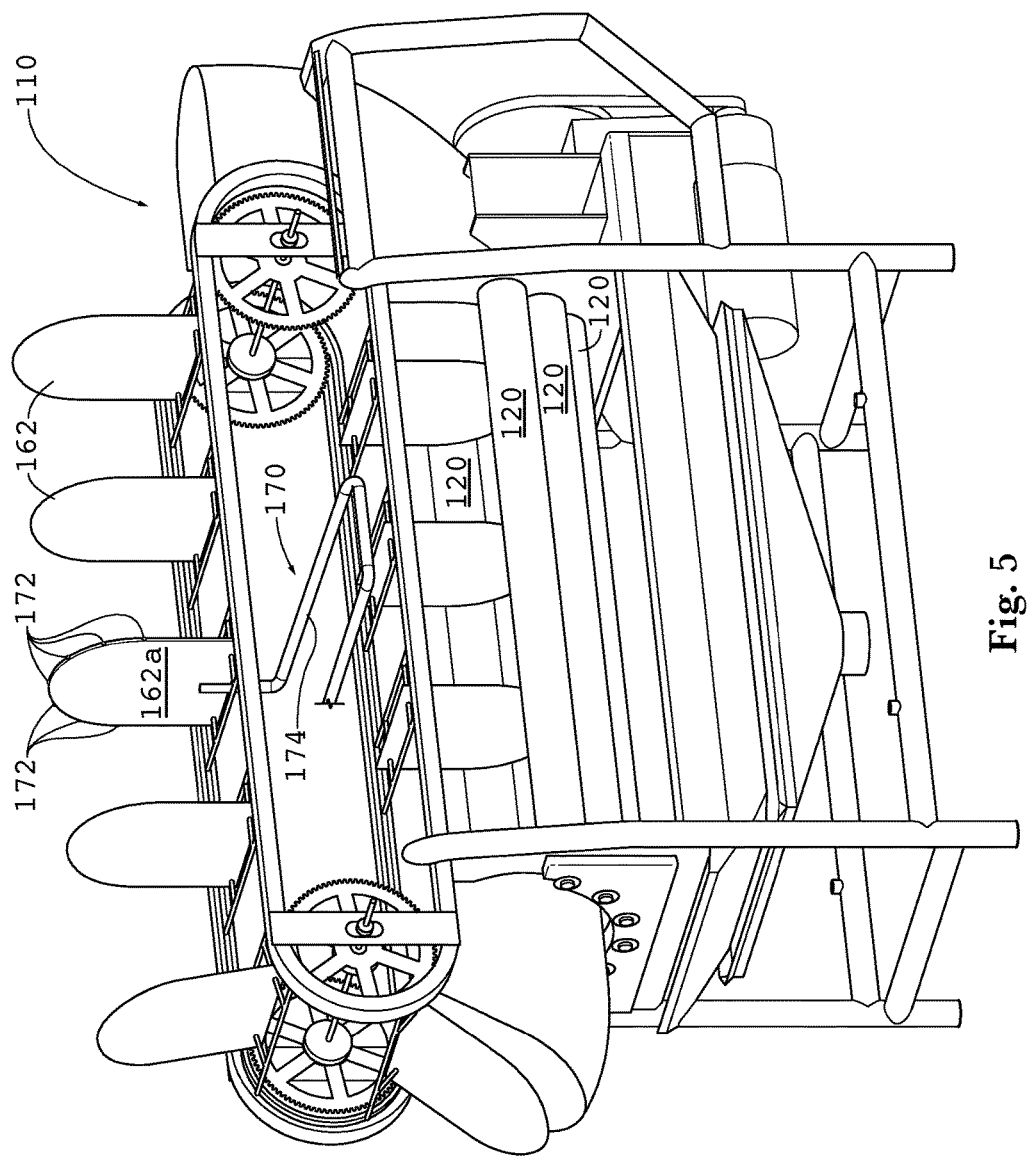
FIG. 5 is a view in perspective illustrating a second embodiment of the present invention.
Figure 6:
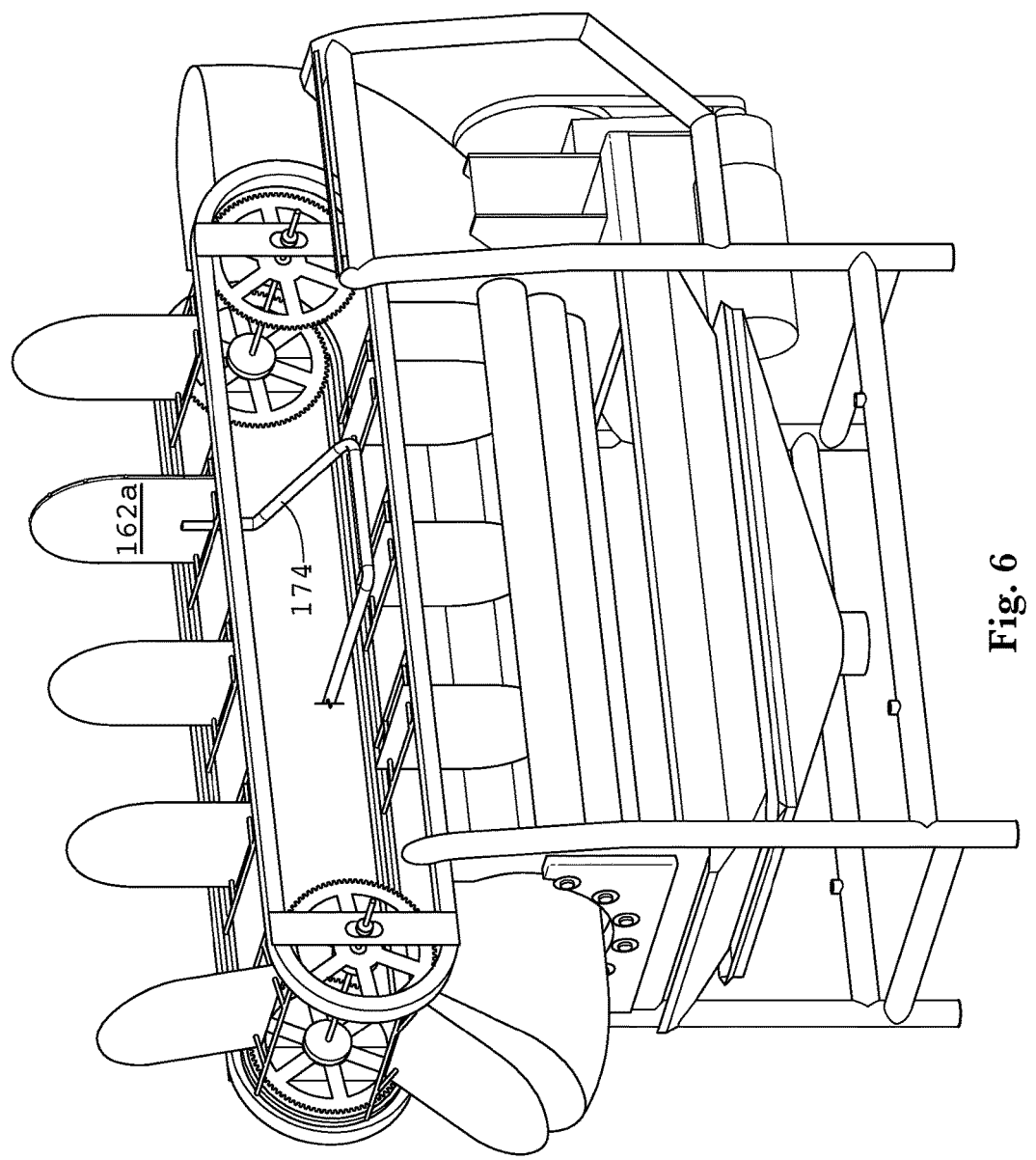
FIG. 6 is a view in perspective illustrating the embodiment of FIG. 5 in a further progression of a panel along the apparatus.

The conduit 174 shown herein thus forms an articulated arm that is able to remain connected to the source of high-pressure water and the wall 162a during operation to accommodate the movement of the wall 162a along its entire path of travel. This travel is shown in FIGS. 5-10 with the wall 162a in a first position in FIG. 5 at the top of the apparatus 110. As the wall 162a is at the top of its revolution around the conveyor system as shown in FIG. 5, it begins with the water off, during which there is no spraying of water out of the nozzles 172. The water is preferably temporarily shut off when the wall 162a is not adjacent the rollers 120, as illustrated in FIGS. 5 and 6. In FIG. 6, the wall 162a is conveyed toward one end of the apparatus 110, and the conduit 174 pivots at its joints to accommodate this movement. No leaks are formed in the conduit 174 by this pivoting movement, although small trickles of water out of the joints would not be harmful.

Figure 7:
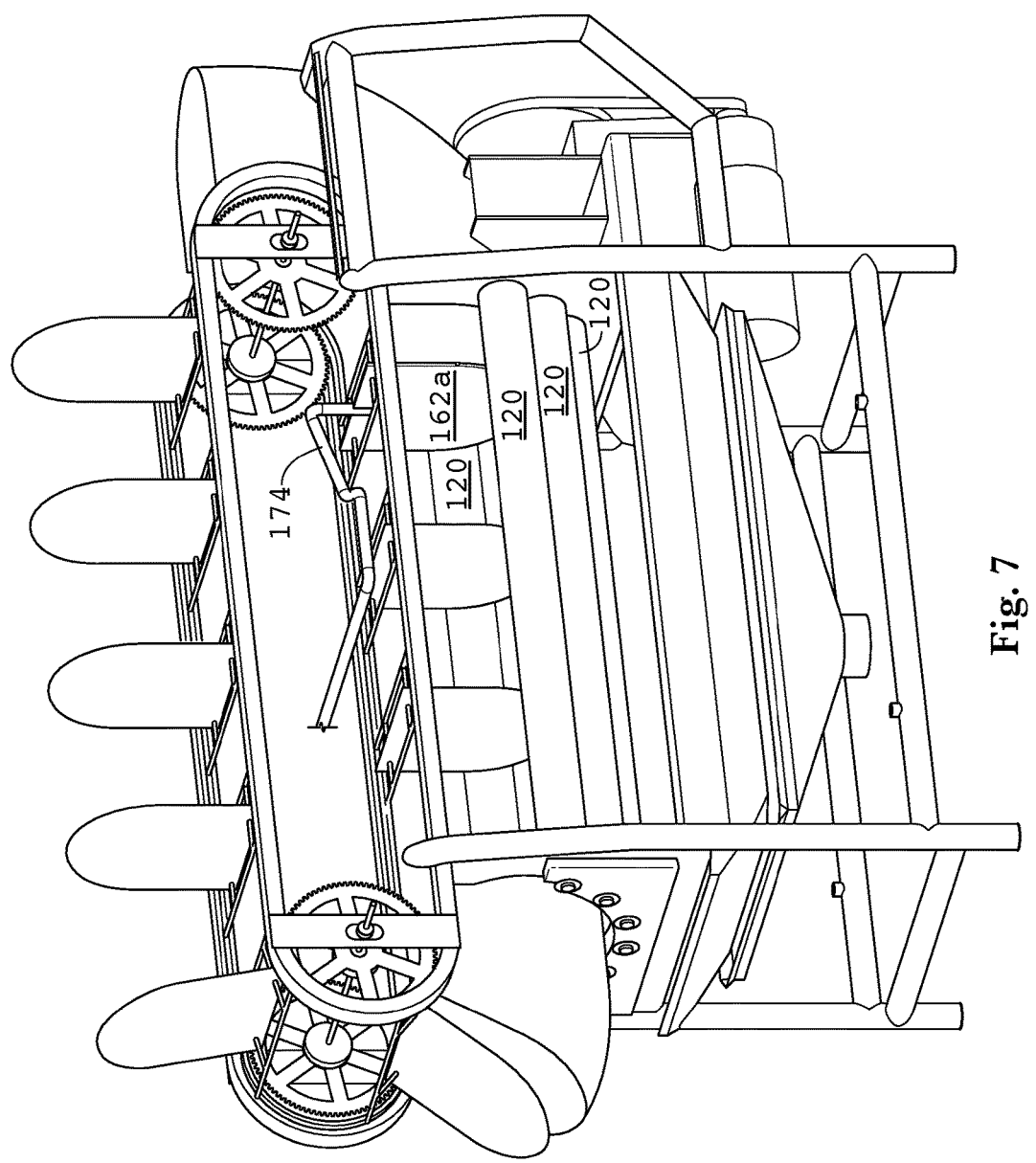
FIG. 7 is a view in perspective illustrating the embodiment of FIG. 6 in a further progression of the panel as it enters the peeler bed.
Figure 8:
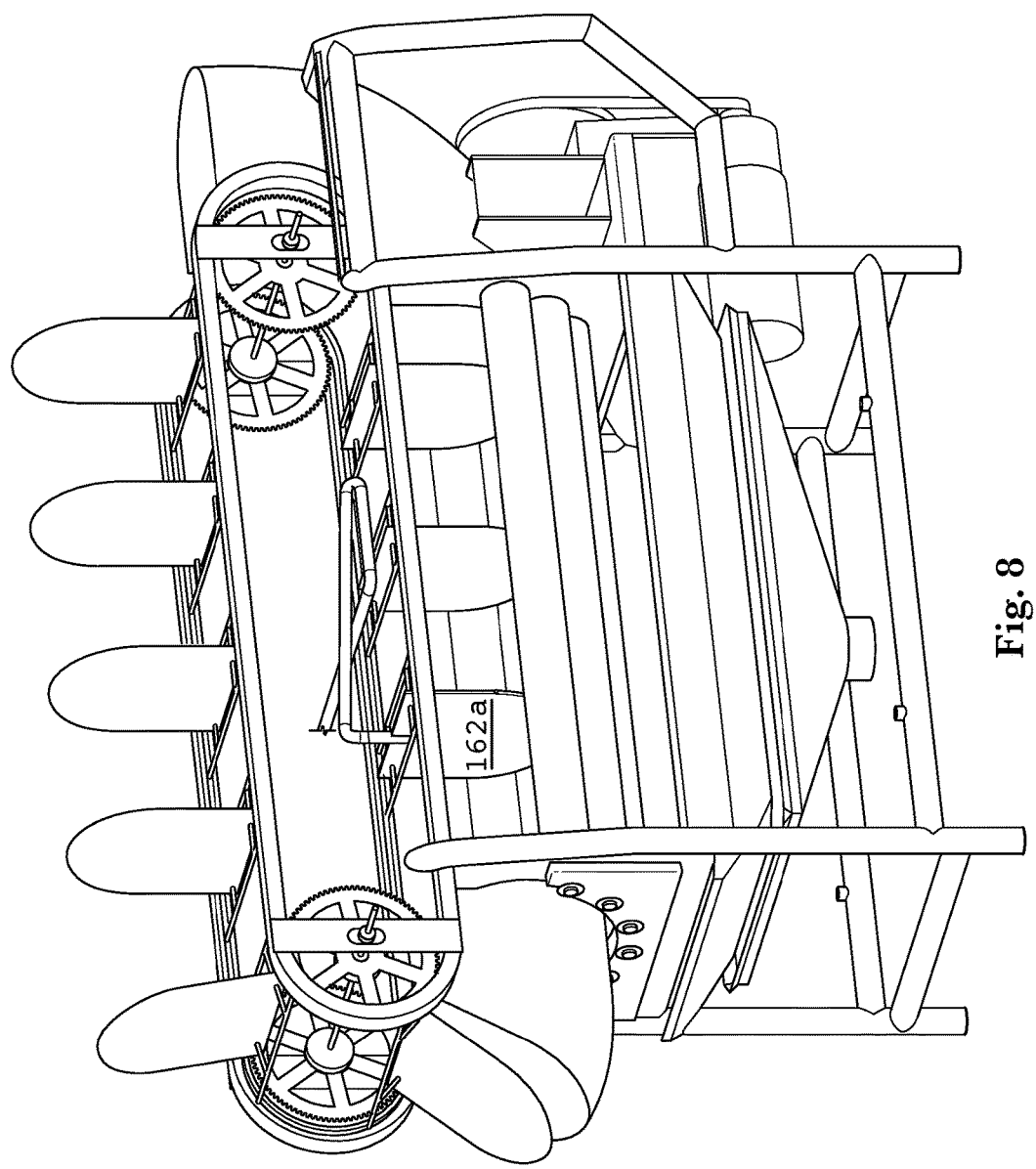
FIG. 8 is a view in perspective illustrating the embodiment of FIG. 7 in a further progression of the panel as it is midway along the peeler bed.
Figure 9:
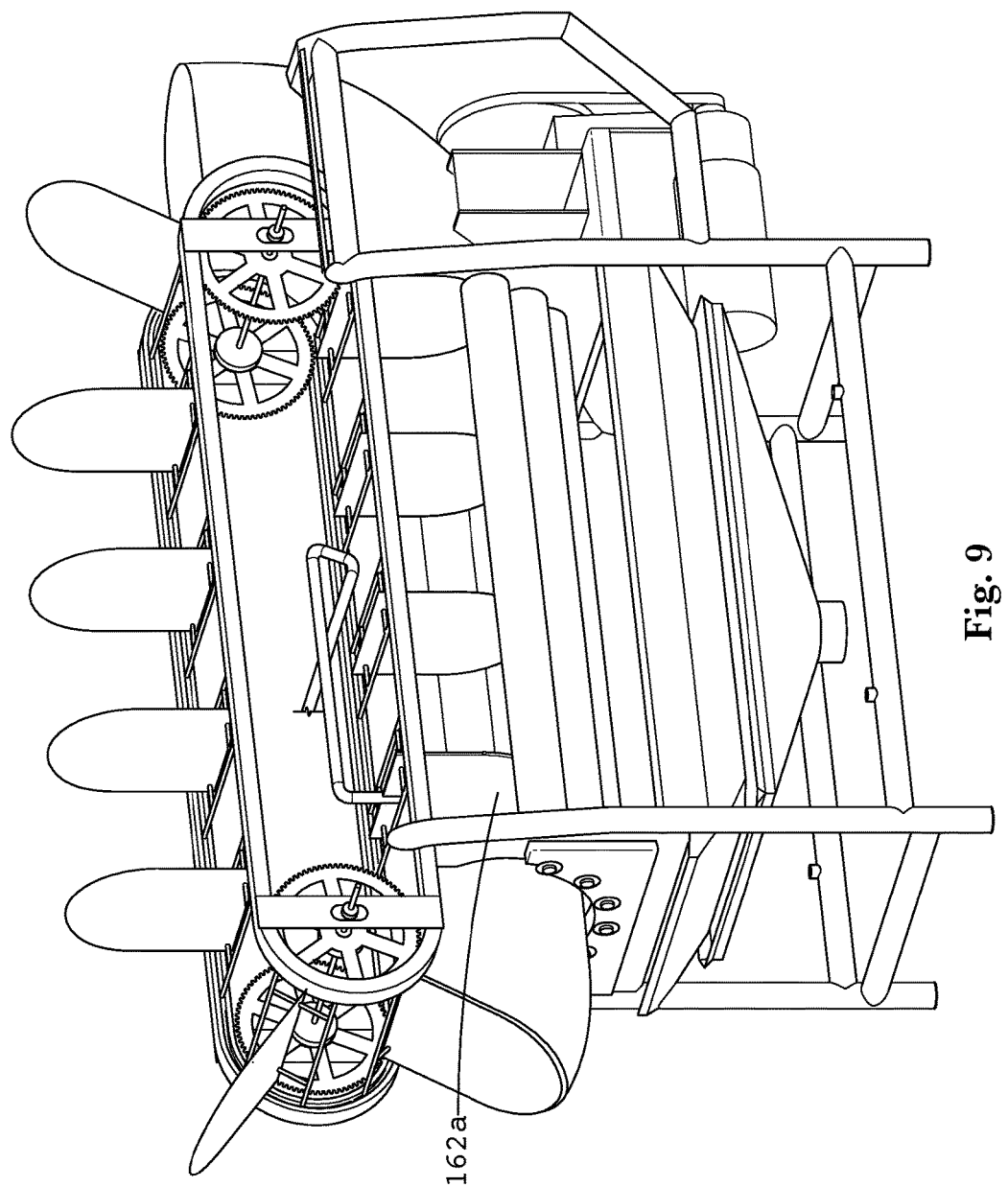
FIG. 9 is a view in perspective illustrating the embodiment of FIG. 8 in a further progression of the panel as it approaches the exit of the peeler bed.

In FIG. 7, the wall 162a is shown just after beginning the lower span of its path of travel adjacent the rollers 120, which is near the first ends of the rollers 120. The conduit 174 continues to pivot at its joints to accommodate this travel, and the high-pressure water has been turned on in order to convey water to the nozzles 172 (not visible in FIG. 7). The water may preferably be turned on just before the wall 162a is conveyed to the rollers' 120 closest ends (and is thus adjacent the rollers 120) shown in FIG. 7, and may be turned off just after the wall 162a passes the opposite ends of the rollers 120. This use of water only when the wall 162a is adjacent the rollers 120 reduces use of water when the water would not clean the rollers 120, and prevents spraying water away from the apparatus 110, which could interfere with nearby equipment or personnel or would require more sophisticated shielding.

When the water is turned on, the nozzles 172 direct the water outwardly from the wall 162a as the wall 162a travels adjacent the rollers 120, which are preferably rotating at the time. This allows the high-pressure water to dislodge and eject most or all particulate that has become lodged in any cavities, or around any protrusions, on the rollers 120. It is contemplated to maintain the same speed of the walls 162 when the wall 162a is adjacent the rollers 120 and the nozzles 172 are spraying, but it is also possible to speed up or slow down the walls 162 when the wall 162a is adjacent the rollers 120 to more effectively clean the rollers 120. If the nozzles 172 spray water as the apparatus 110 operates to peel potatoes or other food products, the wall 162a simply operates as any other of the walls 162, except that it has the additional function of cleaning the rollers 120.

As the wall 162a continues to pass along the path adjacent the rollers 120, the water spraying from the nozzles 172 at the peripheral edges thereof strikes the rotating rollers 120 and removes particulate therefrom. The wall 162a passes from the position shown in FIG. 7, which is just after it begins to be adjacent the rollers 120, to FIG. 8, where it is about midway along the rollers 120, to FIG. 9, where it has nearly reached the opposite ends of the rollers 120. The water is preferably turned on and off by the central computer that receives position data from the servomotor that drives the walls 162 around their path, from conventional proximity sensors that detect the position of the wall 162a, or from equivalent position controls known to the person of ordinary skill It is contemplated that the water is turned on and off by a mechanical switch that is actuated at preferred times due to position of the wall 162a or another portion of the drive chains or walls.

Figure 10:
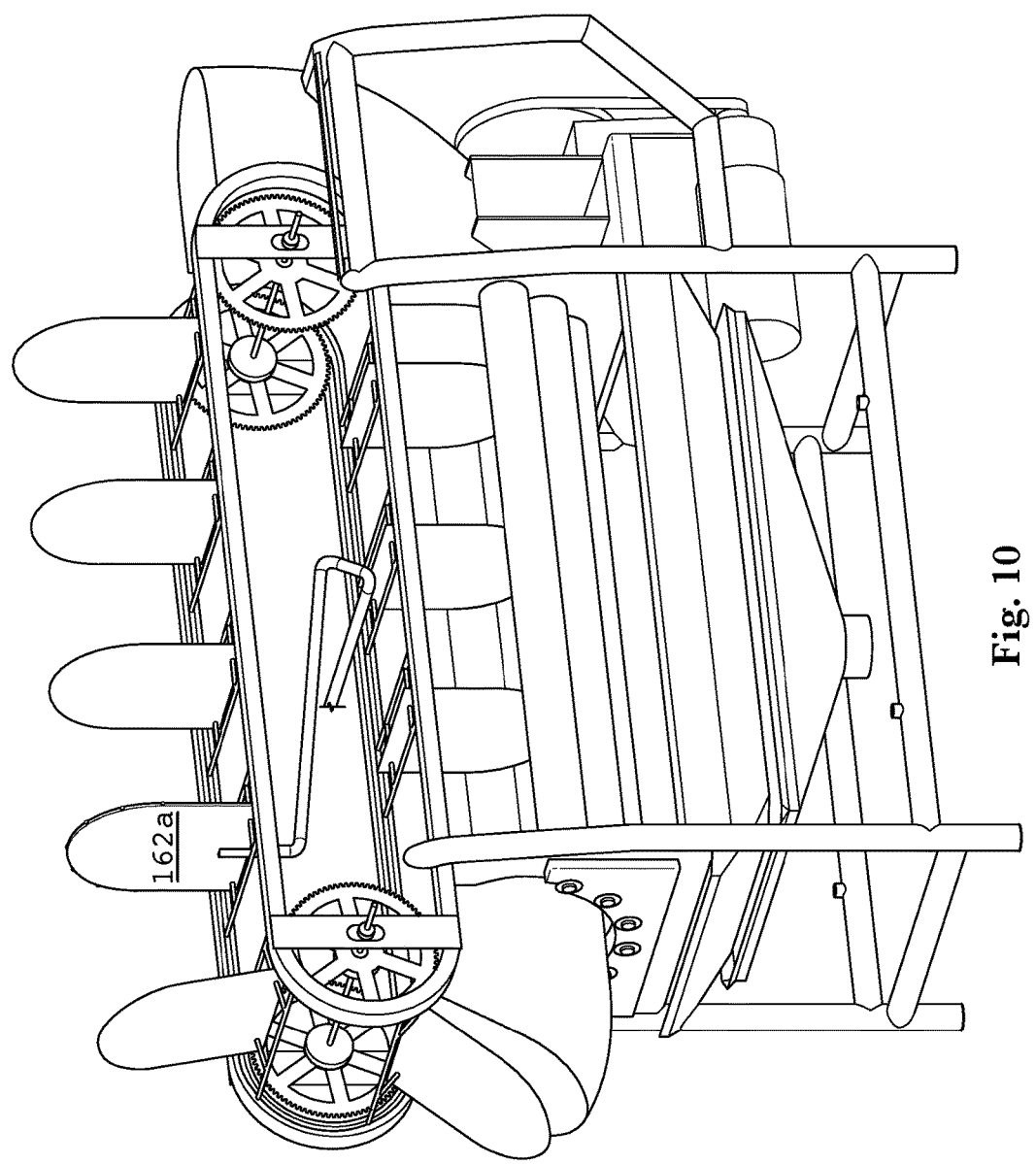
FIG. 10 is a view in perspective illustrating the embodiment of FIG. 9 in a further progression of the panel.

Just after the wall 162a passes the opposite ends of the rollers 120, the water is shut off so that no water is wasted or sprayed away from the apparatus 110 during the remainder of the travel of the wall 162a to the position shown in FIG. 10. The water thus stays off until the wall 162a is just upstream of the position shown in FIG. 7, when the spraying cycle begins again as described above. The position in which the water is turned on and off can be modified, such as from just after the wall 162a is adjacent the first end of the rollers 120 until just before the wall 162a reaches the far end of the rollers 120. This would possibly leave the ends of the rollers 120 without spray from the nozzles 172, but in some cases this may be desirable.

It will become apparent that other structures may be added to the walls of the invention to clean the rollers. This may include brushes and other mechanical cleaning devices that extend laterally and vertically to contact the rollers. These types of devices may be preferred and could be added only during a general cleaning mode when peeling is not taking place. Any cleaning apparatus is contemplated, but only high pressure water is described herein in detail. Another contemplated usage during general cleaning would be to spray cleaning solutions and/or disinfectants well known in the industry directly on the rolls in the absence of food product. A person having ordinary skill will understand how to modify the apparatus based on the description herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A food product peeling apparatus with a plurality of rotatable rollers having substantially parallel axes of rotation and forming an upwardly-facing bed defined by the rollers, the apparatus comprising:
   (a) multiple spaced dividers linked together in a continuous loop extending downwardly to adjacent the rollers with at least some of the dividers disposed in the bed to define separate cavities configured to receive food product that may rest upon the upwardly-facing bed; and
   (b) a prime mover drivingly linked to the dividers for driving the dividers through at least the bed along a path that is substantially parallel to the axes of the rollers.

2. The food product peeling apparatus in accordance with claim 1, further comprising at least one roller cleaner mounted to at least one of the dividers.

3. A food product peeling apparatus with a plurality of rotatable rollers having substantially parallel axes of rotation and forming a bed adjacent the rollers, the apparatus comprising:
   (a) multiple spaced dividers linked together in a continuous loop adjacent the rollers with at least some of the dividers disposed in the bed to define separate cavities configured to receive food product; and (b) a prime mover drivingly linked to the dividers for driving the dividers through at least the bed along a path that is substantially parallel to the axes of the rollers, further comprising at least one roller cleaner mounted to at least one of the dividers wherein said at least one roller cleaner further comprises a brush extending outwardly toward the rollers.

4. The food product peeling apparatus in accordance with claim 3, wherein the roller cleaner further comprises at least one spray nozzle mounted to at least one of the dividers.

5. The food product peeling apparatus in accordance with claim 3, wherein the roller cleaner further comprises:
   (a) a plurality of spray nozzles mounted to at least one of the dividers; and
   (b) at least one conduit extending to at least some of said plurality of spray nozzles from a liquid source.

6. The food product peeling apparatus in accordance with claim 1, further comprising an entry chute having a curvature matching a path followed by a distal end of the dividers.

7. A food product peeling apparatus with a plurality of cylindrical rollers rotatably mounted to a frame, the rollers having substantially parallel axes of rotation and defining an upwardly-facing bed above the rollers, the apparatus comprising:
   (a) a plurality of spaced dividing walls mounted to a flexible, continuous drive loop above the rollers with at least some of the dividing walls extending downwardly toward the bed and disposing edges of the dividing walls directly adjacent radially outwardly-facing surfaces of the rollers, thereby defining separate food product-containing cavities between each next adjacent pair of dividing walls;
   (b) a guide mounted to the frame above the bed for positively guiding the dividing walls in a continuous loop through and above the bed substantially parallel to the axes of the rollers; and
   (c) a prime mover drivingly linked to the drive loop for driving the dividing walls through the guide.

8. The food product peeling apparatus in accordance with claim 7, further comprising at least one roller cleaner mounted to at least one of the dividing walls.

9. The food product peeling apparatus in accordance with claim 8, wherein the roller cleaner further comprises a brush extending outwardly toward the rollers.

10. The food product peeling apparatus in accordance with claim 8, wherein the roller cleaner further comprises at least one spray nozzle mounted to at least one of the dividing walls.

11. The food product peeling apparatus in accordance with claim 8, wherein the roller cleaner further comprises:
   (a) a plurality of spray nozzles mounted to at least one of the dividing walls; and
   (b) at least one conduit extending to at least some of said plurality of spray nozzles from a liquid source.

12. The food product peeling apparatus in accordance with claim 7, further comprising an entry chute having a curvature matching a path followed by a distal end of the dividing walls.

13. The food product peeling apparatus in accordance with claim 7, wherein the dividing walls are spaced along the drive loop substantially equal distances from one another.

14. The food product peeling apparatus in accordance with claim 7, further comprising a curved inlet chute with an inward face having an arcuate shape that approximates an arcuate path that ends of the walls traverse during operation.

* * * * *